(12) United States Patent
Selle

(10) Patent No.: US 7,731,266 B2
(45) Date of Patent: Jun. 8, 2010

(54) BUSHING AND HINGED JOINT COMPRISING SUCH A BUSHING

(75) Inventor: Heinrich Selle, Bad Oeynhausen (DE)

(73) Assignee: Wilhelm Karmann GmbH i.I., Osnabrueck ( * ) Notice: Subject to any disclaimer, the term of this patent is extended or adjusted under 35 U.S.C. 154(b) by 788 days.

(21) Appl. No.: 10/599,686

(22) PCT Filed: Apr. 2, 2005

(86) PCT No.: PCT/DE2005/000584

§ 371 (c)(1),
(2), (4) Date: Nov. 17, 2006

(87) PCT Pub. No.: WO2005/098247

PCT Pub. Date: Oct. 20, 2005

(65) Prior Publication Data

US 2007/0192993 A1    Aug. 23, 2007

(30) Foreign Application Priority Data

Apr. 8, 2004    (DE) .................... 10 2004 017 391

(51) Int. Cl.
*B60J 7/00*    (2006.01)
(52) U.S. Cl. ................................. 296/107.01

(58) Field of Classification Search ............ 296/107.01, 296/121, 29; 16/2.1
See application file for complete search history.

(56) References Cited

U.S. PATENT DOCUMENTS

| 4,951,349 | A | * | 8/1990 | Dietrich et al. | ............... 16/228 |
| 5,599,056 | A | * | 2/1997 | Schmitt | ....................... 296/122 |
| 5,735,631 | A | * | 4/1998 | Patzelt et al. | ................. 403/378 |

FOREIGN PATENT DOCUMENTS

| DE | 29516619 U1 | 2/1996 |
| DE | 19731305 A1 * | 2/1999 |

* cited by examiner

*Primary Examiner*—H Gutman
(74) *Attorney, Agent, or Firm*—Quinn Law Group, PLLC

(57) ABSTRACT

An articulated connection of at least two elements of a folding top mechanism of a convertible vehicle is provided, with a pivot pin, on which at least two elements are mounted next to one another rotationally with respect to the longitudinal axis of the pivot pin, wherein at least one bushing is located on the pivot pin on which a first element is mounted on its hollow cylindrical section, and for which an elastically formed collar extending in the radial direction is formed with an undulating profile in the axial direction, which is designed to compensate for axial and/or radial play between the first element and a second element. The collar has at least one recess forming a material lug extending from the outer edge to the hollow cylindrical section.

12 Claims, 5 Drawing Sheets

BUSHING AND HINGED JOINT COMPRISING SUCH A BUSHING

CROSS-REFERENCE TO RELATED APPLICATION(S)

This application is a US National Phase of International Application No. PCT/DE 2005/000584, filed Apr. 2, 2005, which claims priority to German 10 2004 017 391.5, filed Apr. 8, 2004. The entire contents of the above identified applications are incorporated herein by reference.

TECHNICAL FIELD

The invention relates to an articulated connection of at least two elements of a folding top mechanism of a convertible vehicle, as well as a bushing for the articulated connection.

BACKGROUND OF THE INVENTION

Articulated connections of the aforementioned type having various designs and composed of metal or plastic are known in practice. These bushings are used in articulated connections between two elements which can rotate relative to one another, one of the elements generally being mounted on the hollow cylindrical section of the bushing and a collar separating the two elements from one another in the axial direction of a pivot pin.

To prevent excessive friction between the two rotatably connected elements, it is necessary to provide play between these elements, in particular for metallic surfaces of the elements which are moved with respect to one another.

For applications in which such axial play is undesired for avoiding rattling noise during operation or for ensuring a precise operational sequence, which is the case, for example, for an articulated connection or hinge between elements of a folding top mechanism of a convertible vehicle, a lubricant may be provided between the mutually rotatable parts, which, however, requires additional operating means and more intensive maintenance for the articulated connection.

It is also known in practice to use bushings made of self-lubricating plastic, Teflon, for example, between the surfaces of the articulated connection which are in rotary contact with one another in order to reduce the friction between the surfaces and simultaneously reduce the maintenance effort. A disadvantage of such plastic bushings, however, is that the flexibility of the joint is greatly increased in the articulated region, thereby impairing the precision of motion of, for example, the folding top mechanism.

DE 295 16 619 U1 discloses a hinge for the articulated connection of two arms of a folding rod assembly which for minimizing friction, maintaining operating characteristics, and ensuring increased rigidity of the articulated region has a bushing which is made of liquid crystal-polymer base material and is situated between a pivot pin and the arms of a folding rod assembly supported on the pivot pin. However, such a bushing ensures a play-free connection only for a limited time, since the liquid crystal-polymer base material wears out during operation.

Although a spring washer may be used to compensate for axial play resulting from such a bushing during operation, an additional component is necessary for the articulated connection.

An articulated connection is disclosed in U.S. Pat. No. 5,599,056 between two components of a folding top of a convertible vehicle in which bushings having an inclined collar are arranged on a pivot pin between the two components to be joined in order to achieve noise reduction. The available elasticity of the connection and the time period over which the damping properties can be maintained to the required extent are greatly limited in this design.

Examples of bushings used in articulated connections from other areas of technology are known from U.S. Pat. No. 4,951,349, U.S. Pat. No. 5,735,631, DE 197 31 305 A1, DE 103 40 279 A1, DE 1 575 454 B and FR 2 120 604 A.

SUMMARY OF THE INVENTION

The object of the present invention is to provide an articulated connection between two elements of a folding top mechanism of a convertible vehicle, as well as a bushing in which undesirable axial or radial play can be eliminated permanently, in particular axially, with respect to an element neighboring the bushing.

This objective is achieved according to the invention with an articulated connection and a bushing.

An articulated connection of two folding top elements according to the invention, in which at least one bushing according to the invention is located on the pivot pin, on which a first element is mounted on its hollow cylindrical section, and for which an elastically formed collar extending in the radial direction is formed with an undulating profile in the axial direction, which is designed to compensate for and/or radial play, wherein the collar exhibits at least one recess extending from the outside edge to the hollow cylindrical section, which forms a material lug on the collar, has the advantage that undesirable axial play and also possibly radial play with respect to neighboring components in the installed state, depending on the design of the collar and the elastic effect that can be achieved by the undulating profile, and thereby possibly to extensive rattling noise or functional disturbance under operating conditions, is permanently prevented.

A bushing according to the invention has an especially advantageous design for achieving this result.

The recess in a first section may run at least approximately radially over the collar, from an outer border of the collar, and then may run at least approximately in the circumferential direction of the collar.

For reasons of symmetry it is advantageous to provide at least two material lugs on regions of the collar that are oppositely situated relative to a longitudinal axis of the bushing.

To compensate for axial play and for exerting a certain elastic effect, it is advantageous for the material lug to be curved in the axial direction of the bushing, or to have a bulge in the axial direction of the bushing.

Such a bulge may have, for example, a groove-like design in the radial direction of the collar, or may also have a hemispherical design, in particular on a material lug for the collar.

In a further embodiment, the bulge may also be provided in a groove-like manner on the collar in the circumferential direction thereof, it being possible to provide or omit a material lug or lugs for the collar. In the simplest case, such a groove-like bulge runs in a crimped manner in the circumferential direction of the collar.

In principle, an articulated connection having such a bushing according to the invention may find application in all fields of mechanical engineering, in particular in automotive engineering.

An articulated connection according to the invention offers particular advantages with regard to prevention of rattling noises during driving and for ensuring the proper operational sequence over the service life when the elements to be thus connected are part of a folding top mechanism of a convertible vehicle. The advantages of a robust, low-maintenance, and simply designed articulated connection having a bushing which compensates for axial play may be fully realized in the articulated connection of articulated arms, as well as the connection of a hydraulic cylinder to an articulated arm, or the connection of a main bearing, fixed to the vehicle body, to an articulated arm or to a hydraulic cylinder.

Further advantages and beneficial embodiments of the subject matter of the invention result from the claims, the drawing, and the following description of preferred embodiments of the invention.

DESCRIPTION OF THE PREFERRED EMBODIMENTS

Figure 1:
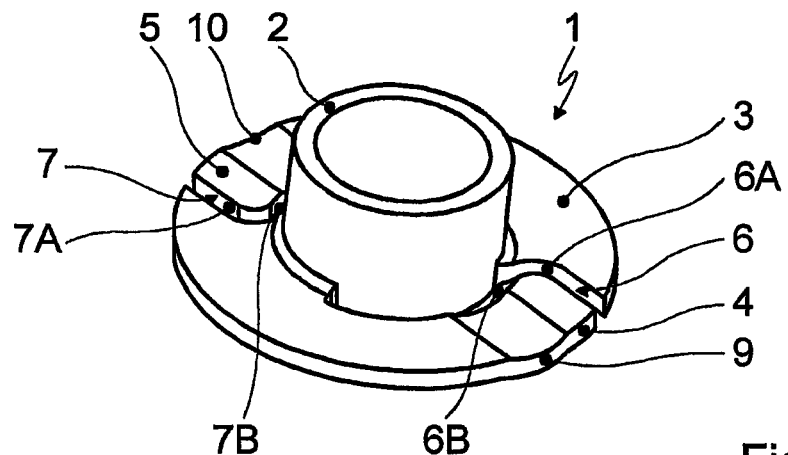
FIG. 1 shows a perspective illustration of a first embodiment of a bushing according to the invention.
Figure 2:
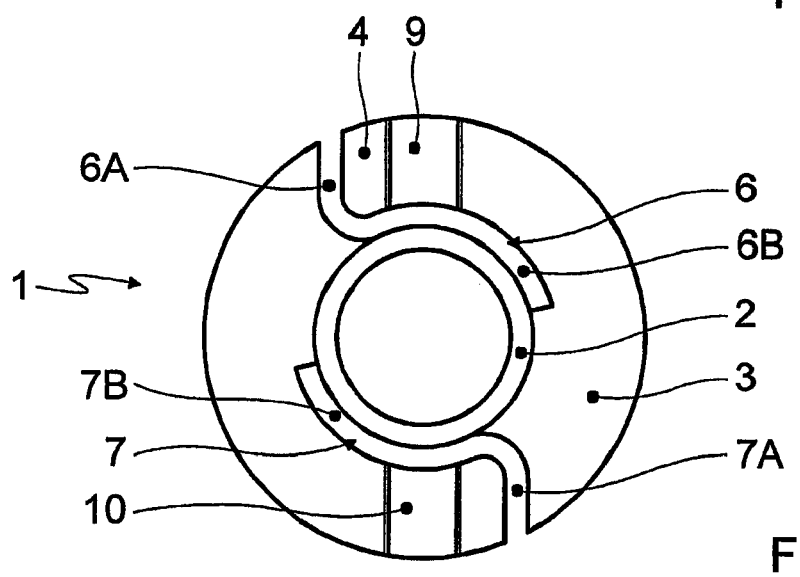
FIG. 2 shows a top view of the bushing of FIG. 1.
Figure 3:
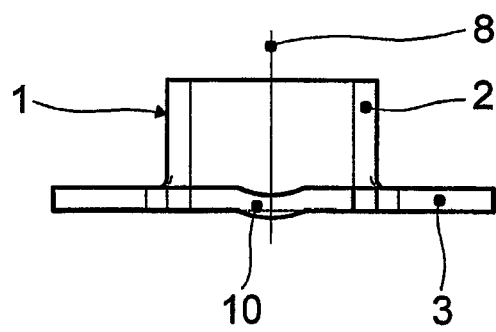
FIG. 3 shows a side view of the bushing according to FIGS. 1 and 2.

With reference to FIGS. 1 through 3, a bushing 1 is shown which comprises a hollow cylindrical section 2, extending in the axial direction of the bushing 1, for accommodating a shaft or a pin, and an elastic collar 3 extending in the radial direction of the bushing 1.

For achieving a profile undulated in the axial direction, in the present case the collar 3 is provided with two material lugs 4, 5 on two oppositely situated regions relative to a longitudinal axis 8 of the bushing, the material lugs 4, 5 in each case being formed by a recess 6, 7 on the collar 3.

In the embodiment according to FIGS. 1 through 3, these gap-like recesses 6, 7, which in embodiment variations may also be only as wide as a cross section, in a first respective section 6A or 7A initially run at least approximately radially over the collar 3, from an outer border of the collar 3 in the direction of the hollow cylindrical section 2 of the bushing 1. In a second respective section 6B or 7B the recesses 6, 7 then run in the circumferential direction of the collar 3, wherein in the embodiment of FIGS. 1 through 3 the curve follows a portion of the circumference of the hollow cylindrical section 2 of the bushing 1.

For forming an undulated profile of the collar 3, the material lugs 4, 5 each have a bulge 9 or 10, respectively, in the axial direction of the bushing 1, the respective bulge 9 or 10 having a grooved design in the radial direction of the collar 3.

However, depending on the application, one skilled in the art may select any other form of bulge, such as one or more hemispherical bulges, for achieving an undulated profile of the collar, the bulge preferably being formed by stamping, or also by material assembly.

Figure 4:
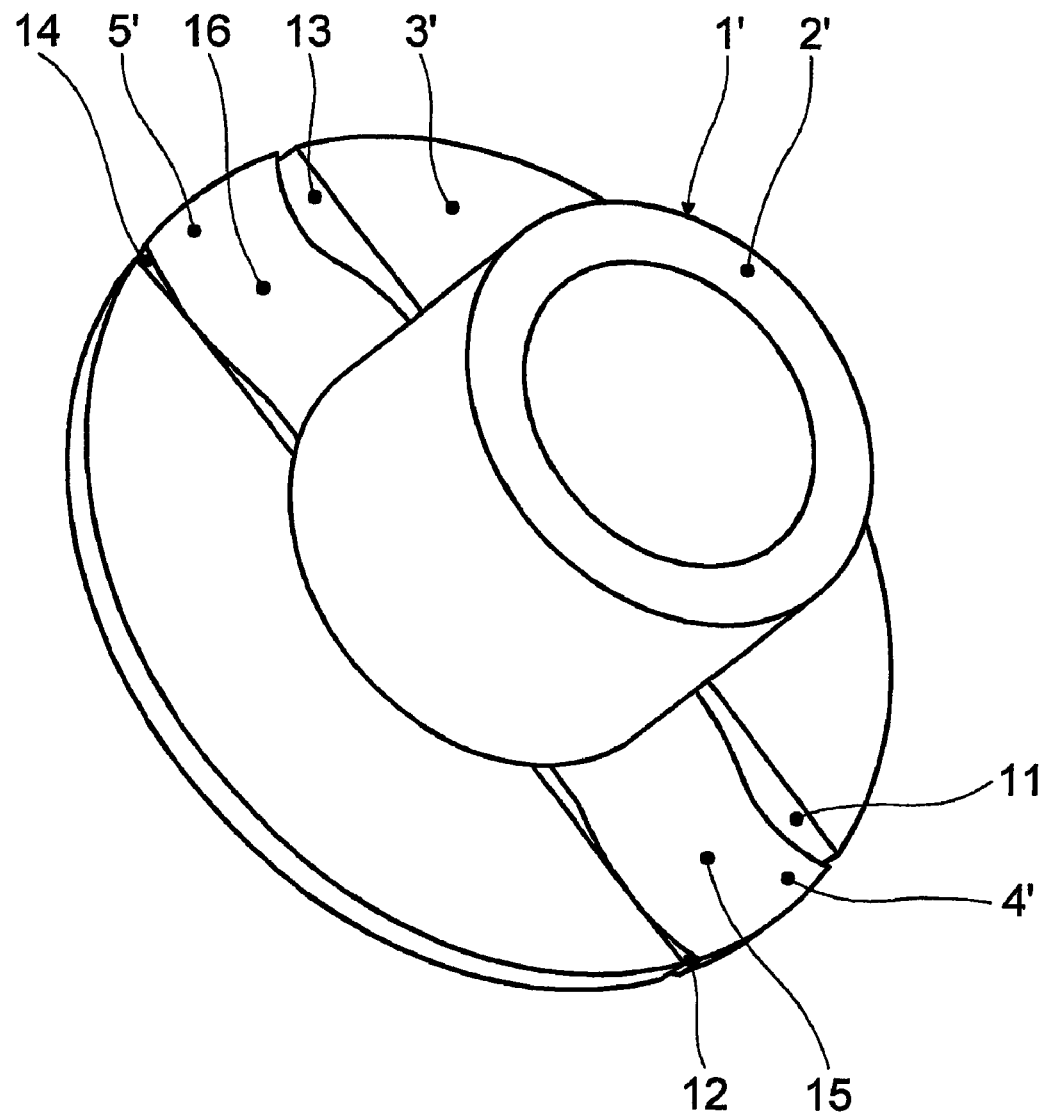
FIG. 4 shows a three-dimensional illustration of a second embodiment of a bushing according to the invention.

FIG. 4 shows a further design of a bushing 1' which, the same as for the bushing 1 in FIGS. 1 through 3, is provided with a hollow cylindrical section 2' and an elastic collar 3', and for compensation of axial play the collar 3' is provided with an undulated profile which likewise is achieved by, for example, two material lugs 4', 5' on the collar 3'.

In contrast to the design in FIGS. 1 through 3, in this case the material lugs 4', 5' are each formed from the collar 3' by two respective parallel, section-like recesses 11, 12 or 13, 14 extending essentially in the radial direction of the bushing 1'.

The undulated profile of the collar 3' is formed in each case by a groove-like bulge 15 or 16 in the respective material lug 4' or 5', extending transverse to the curve of the recesses 11, 12 or 13, 14.

Although each collar 3, 3' in the embodiments shown borders an axial end of the bushing 1, 1', in other advantageous designs the collar may also be situated in a central axial region of the hollow cylindrical section of the bushing.

Figure 5:
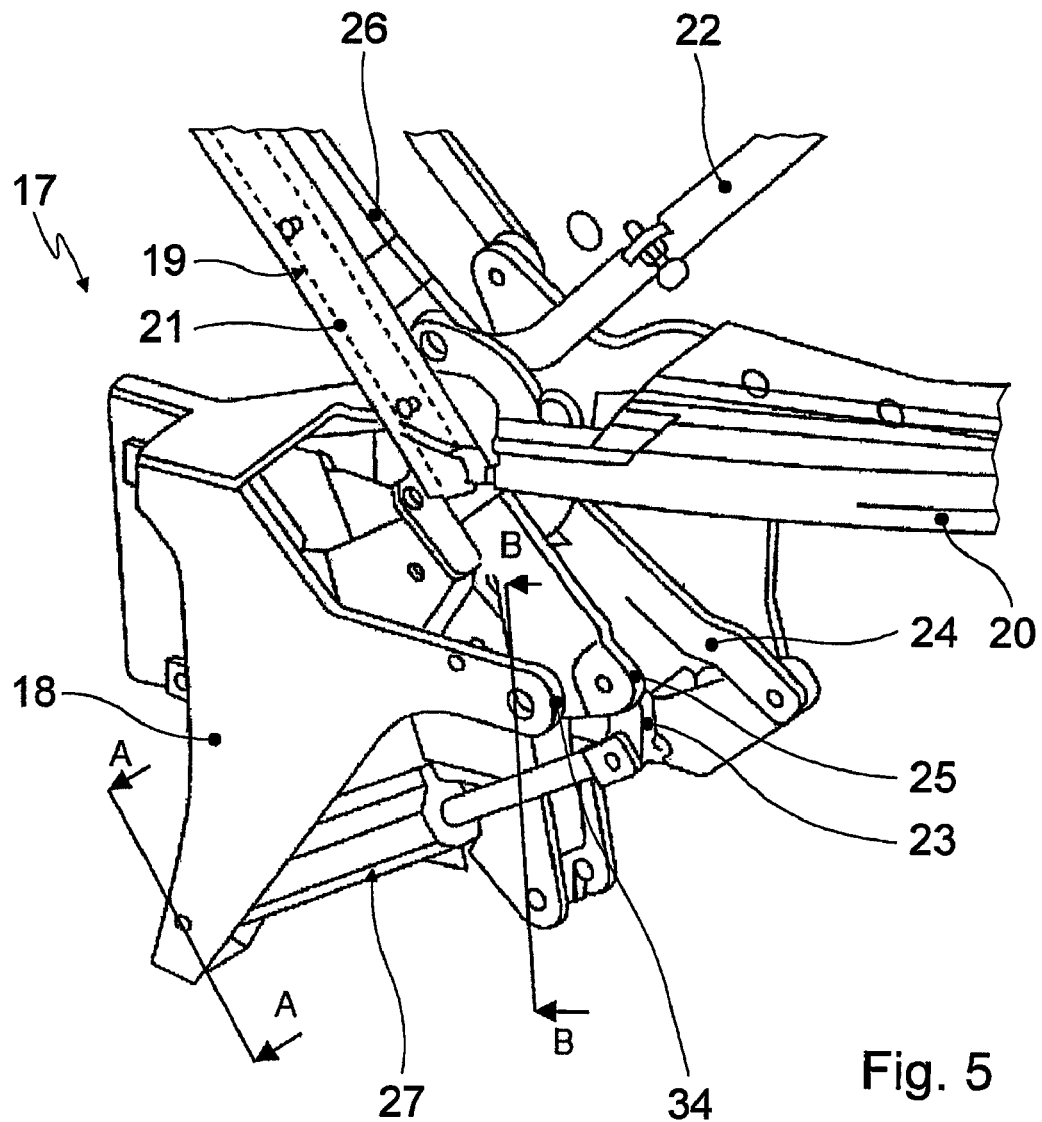
FIG. 5 shows a simplified sectional and perspective illustration of a folding top mechanism of a convertible vehicle in the region of a folding top main bearing having articulated connections according to the invention.
Figure 6:
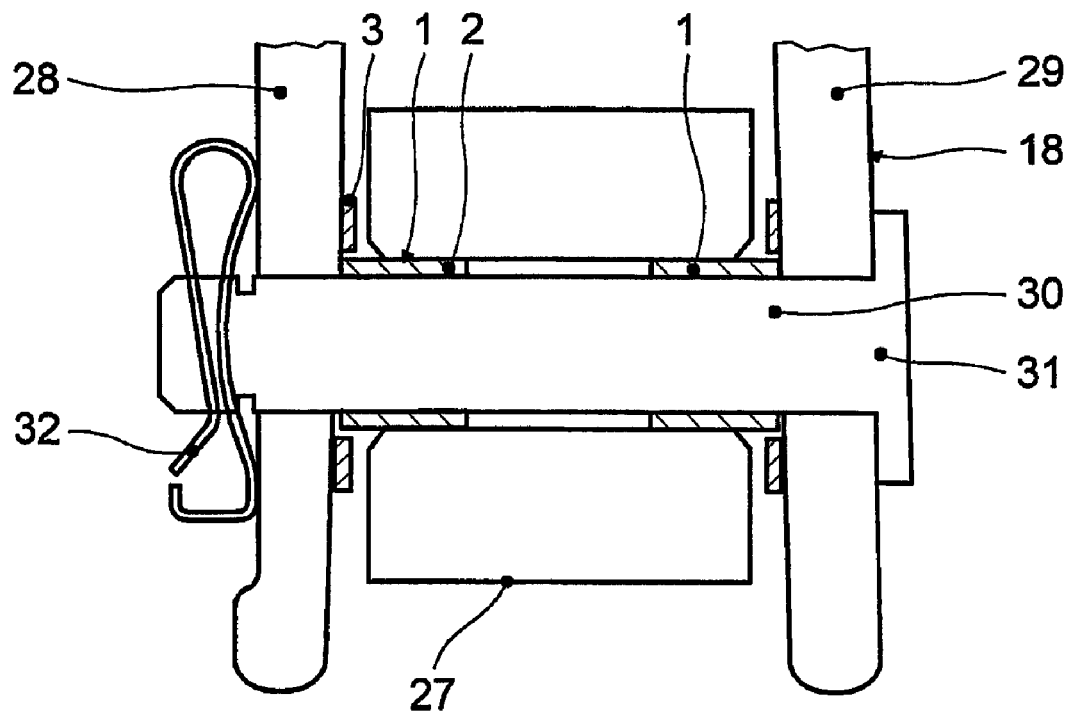
FIG. 6 shows an articulated connection between a main bearing and a hydraulic cylinder for the folding top mechanism of FIG. 5, having a bushing according to the invention in a simplified section along the line A-A in FIG. 5.
Figure 7:
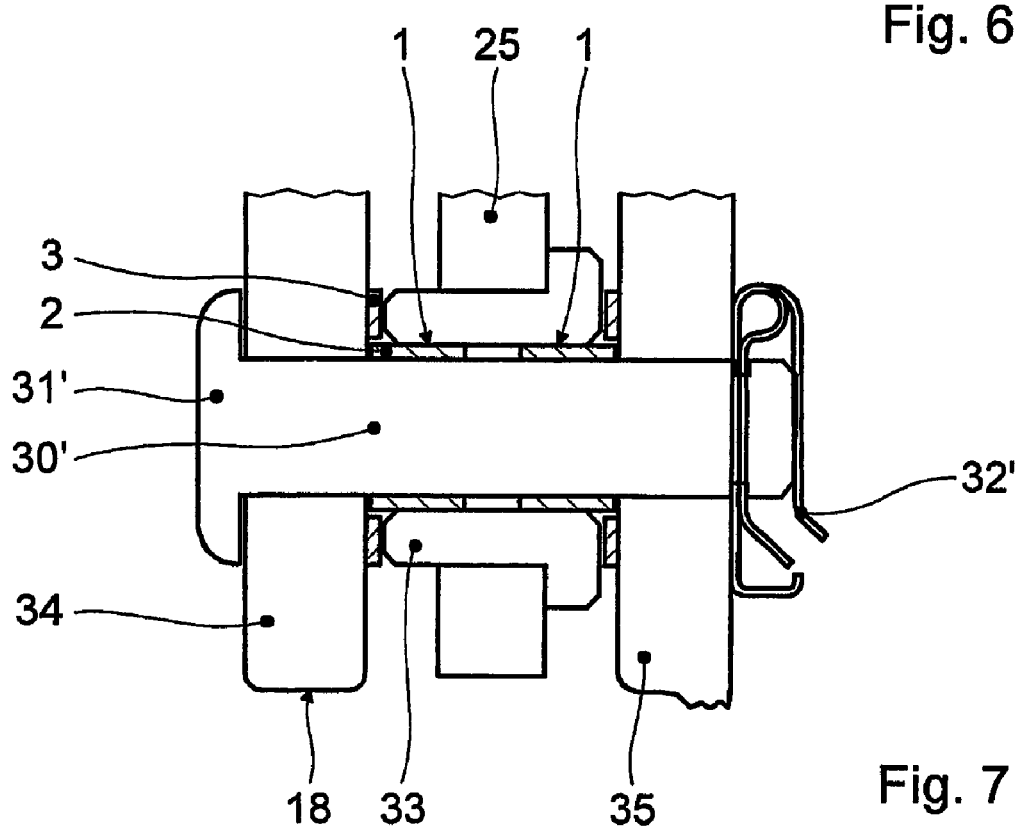
FIG. 7 shows an articulated connection between the main bearing and an articulated arm for the folding top mechanism of FIG. 5 in a simplified sectional view along the line B-B in FIG. 5.

FIGS. 5 through 7 show the bushing 1 as part of an articulated connection of two respective elements of a folding top mechanism 17 having a design known as such in the region of a main bearing 18 fixed to the vehicle body, and having a folding top linkage 19 hinged thereto, of which in the present case a main folding top tension bow 20 which accommodates a roof skin, an outer roof frame profile 21, a rear window support bar 22, and articulated arms 23, 24, 25, 26 provided with these elements for transmitting a drive motion to further elements of the folding top mechanism 17 are shown in particular, and having a hydraulic cylinder 27 which is connected in an articulated manner to both the main bearing 18 and to the folding top linkage 19.

FIG. 6 shows a simplified view of the articulated connection of the hydraulic cylinder 27 between two legs 28, 29 of the main bearing 18, fixed to the vehicle body, for the folding top mechanism 17. The hydraulic cylinder 27 is mounted on a pivot pin 30 which is axially secured on one end by a collar 31 and on the other end by a safety bolt 32. The hydraulic cylinder itself, which is shown only schematically in FIG. 6, is axially mounted without play between the legs 28, 29 of the main bearing 18 on two bushings 1 according to the invention, each of which with its collar 3 rests against the respective leg 28 or 29 and which compensates for axial play between the respective leg of the main bearing 18 and the hydraulic cylinder 27.

The two bushings 1 which accommodate the pin 30 in their hollow cylindrical section 2 in this case are pretensioned in the installed state, the pretension being selected depending on the undulated profile of the collar 3 in such a way that the compensation for axial play is ensured by the bushings 1 over the entire service life of the folding top mechanism 17.

FIG. 7 shows a further example of use of the bushing 1 in an articulated connection of the folding top mechanism 17, in the present case involving a connection between the main bearing 18 and the articulated arm 25 connected to the outer roof frame profile 21. Similar to the arrangement according to FIG. 6, in the articulated connection of FIG. 7, for supporting the articulated arm 25 without axial play two bushings 1 according to the invention are provided on a slide bearing 33 between two legs 34, 35 of the main bearing 18. The bushings 1 once again accommodate a pivot pin 30' which is axially secured by a collar 31' and a safety bolt 32' on the legs 34, 35 of the main bearing 18. Axial motion of the slide bearing 33 which axially adjoins the collar 3 of the bushing 1 is prevented by the bushings 1, in this case likewise mounted under pretension.

Figure 8:
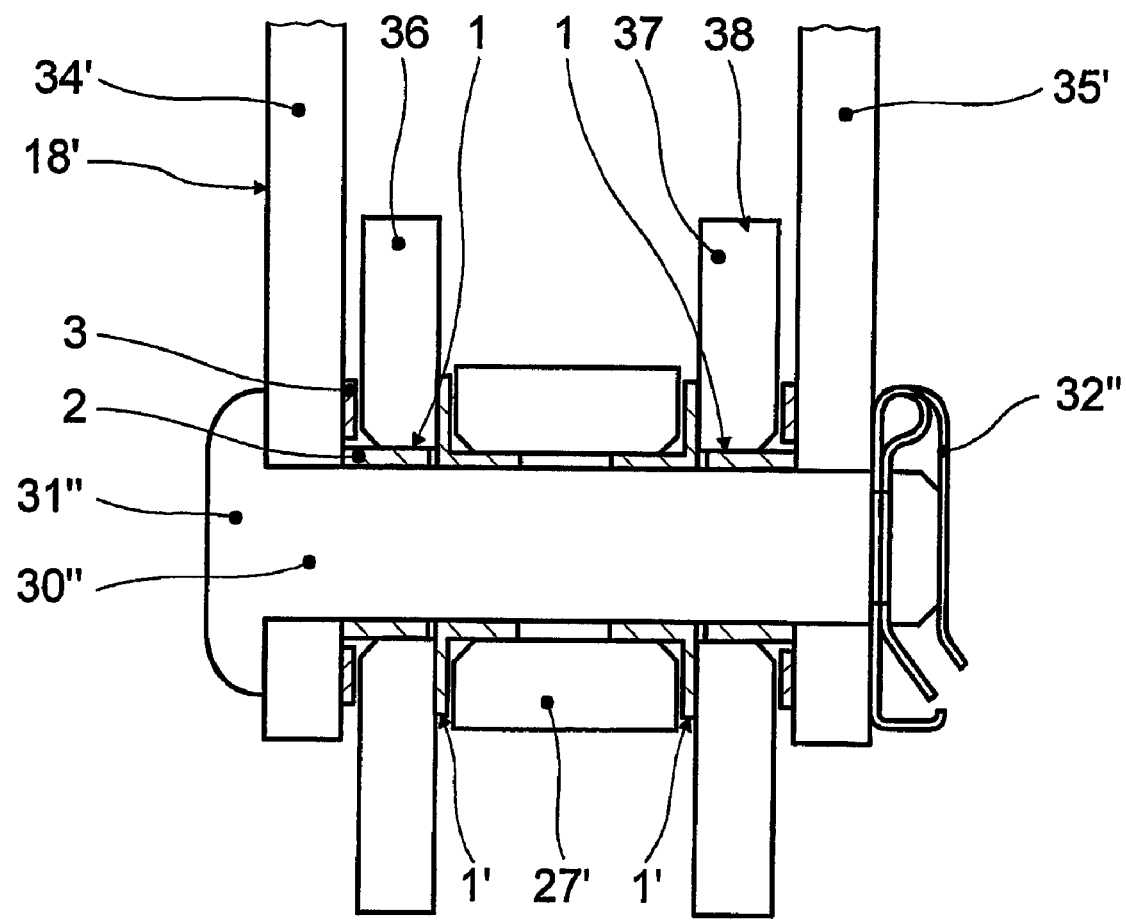
FIG. 8 shows an articulated connection having a bushing according to the invention between a hydraulic cylinder and an articulated arm, and also between articulated arms of a further exemplary embodiment of a folding top mechanism in a simplified sectional view.

FIG. 8 shows a further articulated connection of one embodiment variant of the folding top mechanism in which two bearing legs 34', 35' of a main bearing 18' for a folding top are supported on a pivot pin 30" between a collar 31" and an axial safety bolt 32", at the axially mutually facing inner sides of which two outer bushings 1 adjoin, and whereby in the installed state two legs 36, 37 of a fork-like articulated arm 38, provided for connecting to the folding top linkage, are situated on the outer bushings, and the legs 36, 37 of the articulated arm 38 are each supported on the hollow cylindrical section 2 of the bushing 1 which accommodates in its inner circumference the pivot pin 30", and are separated by the collar 3 of the bushing 1 from the respective adjacent bearing legs 34' or 35' of the main bearing.

Two additional inner bushings 1 are situated on the pivot pin 30", between the legs 36, 37 of the articulated arm, which support a bearing for a hydraulic cylinder 27'.

Here as well, the collar 3 or 3' is designed so that compensation is made for axial play between a bearing leg 34' or 35' of the main bearing 18' and an adjoining leg 36 or 37, or between these legs and the hydraulic cylinder 27', as well as for any radial play.

The articulated connections shown represent connections for a folding top mechanism by way of example only. However, according to the invention one skilled in the art may equip any articulated connection of a folding top mechanism by means of a corresponding design of the bushing according to the invention.

While the best modes for carrying out the invention have been described in detail, those familiar with the art to which this invention relates will recognize various alternative designs and embodiments for practicing the invention within the scope of the appended claims.

LIST OF REFERENCE NUMERALS 1, 1' Bushing
2, 2' Hollow cylindrical section
3, 3' Collar
4, 4' Material lug
5, 5' Material lug
6 Recess
6A First section of the recess
6B Second section of the recess
7 Recess
7A First section of the recess
7B Second section of the recess
8 Longitudinal axis
9 Bulge
10 Bulge
11 Recess
12 Recess
13 Recess
14 Recess
15 Bulge
16 Bulge
17 Folding top mechanism
18, 18' Main bearing
19 Folding top linkage
20 Main folding top tension bow
21 Outer roof frame profile
22 Rear window support bar
23 Articulated arm
24 Articulated arm
25 Articulated arm
26 Articulated arm
27, 27' Hydraulic cylinder
27 Leg of the main bearing
29 Leg of the main bearing
30, 30', 30" Pivot pin
31, 31', 31" Collar
32, 32', 32" Safety bolt
33 Slide bearing
34, 34' Bearing leg
35, 35' Bearing leg
36 Leg of articulated arm
37 Leg of articulated arm
38 Articulated arm

The invention claimed is:

1. A folding top mechanism for a convertible car with an articulated connection, the mechanism comprising:
a pivot pin (30, 30', 30"), on which at least two elements (18, 27; 18, 25; 27, 23) are mounted next to one another rotationally with respect to the longitudinal axis of the pivot pin (30, 30', 30"); and
at least one bushing (1) located on the pivot pin (30, 30", 30"), wherein the at least one bushing includes a hollow cylindrical section (2) on which a first element (23, 27, 33) is mounted for prevention of rattling noises during driving, and an elastically formed collar (3, 3') extending in the radial direction including an undulating profile in the axial direction, which is designed to compensate for at least one of an axial play and a radial play between the first element (23, 27, 33) and a second element (18, 27), characterized in that the collar (3, 3') has at least one recess (6, 7, 11, 12, 13, 14) extending from an outer edge of the collar (3, 3') to the hollow cylindrical section (2) to define a material lug (4, 4', 5, 5').

2. A folding top mechanism according to claim 1, characterized in that two recesses (11, 12, 13, 14) extending essentially in the radial direction each form a respective material lug.

3. A folding top mechanism according to claim 1, wherein the at least one recess (6, 7) includes a first section (6A, 7A) extending from the outer edge of the collar (3), at least approximately radially over the collar (3), and wherein the at least one recess further includes a second section (6B, 7B) extending at least approximately in the circumferential direction to form the material lug (4, 5).

4. A folding top mechanism according to claim 1, wherein the at least one bushing includes at least two recess's defining at least two material lugs (4, 4', 5, 5'), which are provided on regions of the collar (3, 3') that are oppositely situated relative to a longitudinal axis (8) of the bushing (1, 1').

5. A folding top mechanism according to claim 1, characterized in that the material lug (4, 4', 5, 5') includes at least one bulge (9, 10, 15, 16) in the axial direction of the collar.

6. A folding top mechanism according to claim 5, characterized in that the bulge (9, 10) has a groove-like design in the radial direction of the collar (3).

7. A folding top mechanism according to claim 5, characterized in that the bulge is provided in a groove-like manner on the collar in the circumferential direction thereof.

8. A folding top mechanism according to claim 5, characterized in that the bulge has a hemispherical design.

9. A folding top mechanism according to claim 1, characterized in that one of the elements is an articulated arm (23).

10. A folding top mechanism according to claim 1, characterized in that one of the elements is a hydraulic cylinder (27).

11. A folding top mechanism according to claim 1, characterized in that one of the elements is a main bearing (18), fixed to a vehicle body.

12. A bushing for an articulated connection, the bushing comprising:
- a hollow cylindrical section (2, 2') extending in the axial direction for accepting a shaft or a pin (30, 30', 30") and with a collar (3, 3') that is formed elastically extending in the radial direction, that is formed with a profile that is undulating in the axial direction, which is designed to compensate for at least one of an axial play and a radial play,
- characterized in that a recess (6, 7) in a first section (6A, 7A) running from an outer edge of the collar (3), at least approximately radially over the collar (3), and in a second section (6B, 7B) extending at least approximately in the circumferential direction forms a respective material lug (4, 5).

* * * * *